United States Patent
Rebinger et al.

(10) Patent No.: US 12,480,713 B2
(45) Date of Patent: Nov. 25, 2025

(54) RADIATOR ARRANGEMENT WITH AT LEAST TWO HEAT EXCHANGERS WITH DIFFERENT BASE AREAS, MOTOR VEHICLE WITH RADIATOR ARRANGEMENT

(71) Applicant: AUDI AG, Ingolstadt (DE)

(72) Inventors: Christian Rebinger, Munich (DE); Dirk Schroeder, Manching (DE)

(73) Assignee: AUDI AG, Ingolstadt (DE)

( * ) Notice: Subject to any disclaimer, the term of this patent is extended or adjusted under 35 U.S.C. 154(b) by 116 days.

(21) Appl. No.: 18/701,308

(22) PCT Filed: Aug. 30, 2022

(86) PCT No.: PCT/EP2022/073991
§ 371 (c)(1),
(2) Date: Apr. 15, 2024

(87) PCT Pub. No.: WO2023/061653
PCT Pub. Date: Apr. 20, 2023

(65) Prior Publication Data
US 2024/0418449 A1 Dec. 19, 2024

(30) Foreign Application Priority Data
Oct. 15, 2021 (DE) ...................... 10 2021 126 835.4

(51) Int. Cl.
*F28D 1/04* (2006.01)
*F28D 21/00* (2006.01)

(52) U.S. Cl.
CPC ...... *F28D 1/0452* (2013.01); *F28D 2021/007* (2013.01); *F28D 2021/0073* (2013.01); *F28D 2021/0091* (2013.01)

(58) Field of Classification Search
CPC ............ F28D 1/0452; F28D 2021/007; F28D 2021/0073; F28D 2021/0091; B60K 11/04; B60K 1/00; B60K 11/02; B60K 2001/005
See application file for complete search history.

(56) References Cited

U.S. PATENT DOCUMENTS 4,063,431 A * 12/1977 Dankowski .......... B60H 1/3227
123/196 AB
5,046,554 A * 9/1991 Iwasaki .................. B60K 11/04
165/44
(Continued)

FOREIGN PATENT DOCUMENTS

DE 102019216578 B4 * 6/2024 ............ F28F 9/002
DE 102023135439 A1 * 6/2025 ............ B60K 11/04
(Continued)

*Primary Examiner* — Jon T. Schermerhorn, Jr.
(74) *Attorney, Agent, or Firm* — Maier and Maier, PLLC

(57) ABSTRACT

A radiator arrangement for a motor vehicle the motor vehicle is driven by an internal combustion engine or at least partially electrically, with a first heat exchanger that is connected to a coolant circuit of the motor vehicle; and with a second heat exchanger that is connected to a refrigerant circuit of the motor vehicle. With respect to a main direction of an air flow through the radiator arrangement, the first heat exchanger is arranged in front of the second heat exchanger, and a first base area of the first heat exchanger that is exposed to the air flow is smaller than a second base area of the second heat exchanger that is exposed to the air flow. The first base area is dimensioned such that it overlaps the second base area only in an inlet-side region with respect to the refrigerant flow in the second heat exchanger.

20 Claims, 3 Drawing Sheets

(56) References Cited

U.S. PATENT DOCUMENTS

| | | | | |
|---|---|---|---|---|
| 6,182,744 B1* | 2/2001 | Nakamura | ............ | F28D 1/0417 |
| | | | | 62/509 |
| 7,128,178 B1* | 10/2006 | Heinle | ................. | F28D 1/0426 |
| | | | | 165/41 |
| 7,178,579 B2* | 2/2007 | Kolb | ................... | F02B 29/0475 |
| | | | | 165/41 |
| 7,347,248 B2* | 3/2008 | Kolb | ........................ | F28F 9/02 |
| | | | | 60/599 |
| 7,886,860 B2* | 2/2011 | Spieth | ................... | B62D 25/084 |
| | | | | 165/47 |
| 8,365,809 B2* | 2/2013 | Sugimoto | ............... | F28F 9/002 |
| | | | | 165/140 |
| 9,669,681 B2* | 6/2017 | Oono | ................. | B60H 1/00335 |
| 9,694,668 B1* | 7/2017 | Yun | ........................ | B60K 11/06 |
| 11,951,797 B2* | 4/2024 | Simofi-Ilyes | ........... | B60K 11/02 |
| 2006/0278365 A1* | 12/2006 | Sanada | ................... | F28F 9/002 |
| | | | | 165/41 |
| 2007/0062671 A1* | 3/2007 | Sugimoto | ............. | F28D 1/0452 |
| | | | | 165/140 |
| 2023/0060450 A1* | 3/2023 | Nishiyabu | ............. | B62K 11/04 |
| 2025/0189231 A1* | 6/2025 | Kim | ........................ | B60K 11/06 |

FOREIGN PATENT DOCUMENTS

| | | | | |
|---|---|---|---|---|
| DE | 102023136050 A1 * | 6/2025 | ............. | B60K 11/06 |
| EP | 0380917 B1 * | 9/1992 | ........... | F02B 29/0475 |

* cited by examiner

RADIATOR ARRANGEMENT WITH AT LEAST TWO HEAT EXCHANGERS WITH DIFFERENT BASE AREAS, MOTOR VEHICLE WITH RADIATOR ARRANGEMENT

FIELD

The invention relates to a radiator arrangement, in particular a radiator package, for a motor vehicle driven by an internal combustion engine or at least partially electrically driven, with a first heat exchanger that is or can be connected to a coolant circuit of the motor vehicle; a second heat exchanger that is or can be connected to a refrigerant circuit of the motor vehicle; wherein, with respect to a main direction of an air flow through the radiator arrangement, the first heat exchanger is arranged in front of the second heat exchanger, and wherein a first base area of the first heat exchanger that is exposed to the air flow is smaller than a second base area of the second heat exchanger that is exposed to the air flow.

BACKGROUND

With regard to known radiator arrangements or radiator packages, reference is made, for example, to U.S. Pat. No. 6,182,744 B1, from which a radiator arrangement with an additional heat exchanger is known, wherein the heat exchanger and a gas radiator or condenser have an area ratio to one another. DE 199 28 193 A1 shows the serial arrangement of a coolant radiator and a charge air radiator. From DE 10 2007 022 859 A1 the serial arrangement of two heating heat exchangers with essentially the same area is known.

In cooling arrangements for vehicles powered by internal combustion engines or at least partially by electricity, it is particularly desirable that electrical energy can be used as effectively as possible, for example through optimized operation of a refrigeration system or coolant circuits. In previous radiator arrangements it has been shown that due to the flow of coolant through the first heat exchanger, the air flow is heated and then hits the second heat exchanger in a heated state. If this happens with heat exchangers that are essentially the same size, i.e. with essentially the same base area, the refrigerant circulating in the second heat exchanger cannot be cooled optimally, in particular the cooling potential of the refrigerant is not fully exploited. Furthermore, it is also possible that the air flow heats the refrigerant at least in some regions. This can lead to losses in the efficiency and performance of a refrigeration system.

SUMMARY

The object of the invention is to provide a radiator arrangement in which the above disadvantages can be avoided or at least reduced.

The invention relates to a radiator arrangement, in particular a radiator package, for a motor vehicle driven by an internal combustion engine or at least partially electrically, with a first heat exchanger that is or can be connected to a coolant circuit of the motor vehicle and with a second heat exchanger that is or can be connected to a refrigerant circuit of the motor vehicle; wherein, with respect to a main direction of an air flow through the radiator arrangement, the first heat exchanger is arranged in front of the second heat exchanger, and wherein a first base area of the first heat exchanger that is exposed to the air flow is smaller than a second base area of the second heat exchanger that is exposed to the air flow. It is intended that the first base area is dimensioned such that it overlaps the second base area only in an inlet-side region with respect to the refrigerant flow in the second heat exchanger.

This ensures that an air flow heated by the first heat exchanger only occurs at points or regions of the second heat exchanger that are so warm or hot that heat transfer to already heated air is possible. Thus, the efficiency of cooling the refrigerant in the second heat exchanger as well as the performance of the refrigerant circuit can be increased, which leads to optimized operation of the refrigerant circuit or of the overall system connected to the second heat exchanger. In other words, the radiator arrangement provides a thermally optimized positioning of the two heat exchangers relative to each other.

In the radiator arrangement, the main flow direction of coolant in the first heat exchanger can be substantially parallel or orthogonal to the main flow direction of refrigerant in the second heat exchanger.

In the radiator arrangement, the first base area can be up to about 80% of the second base area, in particular about 10% to 60%. This ensures that only a small part of the second base area is covered by the first base area, so that also at least 20% of the second base area is hit by the air flow without first passing through the first heat exchanger. In particular, the arrangement or base area relationship of the heat exchangers to one another is intended to prevent a portion or region of the base area of the second heat exchanger from being covered over a large area by the first heat exchanger if in the corresponding portion or region the refrigerant is present near the outlet portions of at least the first flow or in the region of the change in flow direction. A possibly preferred and particularly advantageous ratio of first base area to second base area can be considered to be at about 20% to 50%.

In the radiator arrangement, the second heat exchanger can be designed to distribute the inlet-side refrigerant flow over a thermally effective flow width within the second heat exchanger, wherein the first base area has a width that substantially corresponds to the flow width in the second heat exchanger. In other words, the structural design of the first heat exchanger is based on the fluid flow in the second heat exchanger located downstream on the air side. This also ensures that the first heat exchanger (only) covers the warmest area of the second heat exchanger.

In the radiator arrangement, the first heat exchanger can be designed to let coolant flow through unidirectionally or bidirectionally with deflection. In other words, the first heat exchanger can be designed as a single-flow (I-Flow) or a double-flow (U-Flow) type.

In the radiator arrangement, the second heat exchanger can have at least one upper heat exchanger region and at least one lower heat exchanger region, wherein the second base area comprises the upper heat exchanger region and the lower heat exchanger region.

The lower heat exchanger region can be designed as a subcooling path.

Furthermore, the first base area can only overlap a region of the upper heat exchanger region. In other words, the first heat exchanger is arranged outside the subcooling path of the second heat exchanger and covers only part of the first heat exchanger region.

In the radiator arrangement, the main flow direction of coolant in the first heat exchanger can be substantially parallel or orthogonal to the main flow direction of refrigerant in the upper heat exchanger region of the second heat exchanger. It is therefore irrelevant in which direction the refrigerant flows in the second heat exchanger region, in particular in the subcooling path, because this region is not exposed to an air flow that has been heated by the first heat exchanger.

In the radiator arrangement, the first heat exchanger can be a low-temperature radiator. In particular, this can be a so-called deep low-temperature radiator.

In the radiator arrangement, the second heat exchanger can be a condenser or gas radiator.

Although a structure or configuration of a radiator arrangement with a first and a second heat exchanger is proposed above, it should be noted that the configuration can also have a plurality of first and/or a plurality of second heat exchangers. Furthermore, it is also conceivable that a configuration or structure has three heat exchangers arranged one behind the other.

A motor vehicle with an internal combustion engine or at least partially electric drive with at least one coolant circuit for cooling at least one electrical component, in particular a high-voltage battery and/or electric motor, and with at least one refrigerant circuit for air conditioning a vehicle interior can have a radiator arrangement as described above, wherein the first heat exchanger is connected to the coolant circuit and the second heat exchanger is connected to the refrigerant circuit.

It should be noted that the functionality of the first heat exchanger can also be used or transferred for or to a (servo) oil cooling function, charge air cooling or additional water cooling. The area of application is therefore not necessarily limited to the cooling of electrical components.

BRIEF DESCRIPTION OF THE FIGURES

Further advantages and details of the invention result from the following description of embodiments with reference to the figures. In the figures.

DETAILED DESCRIPTION

Figure 1:
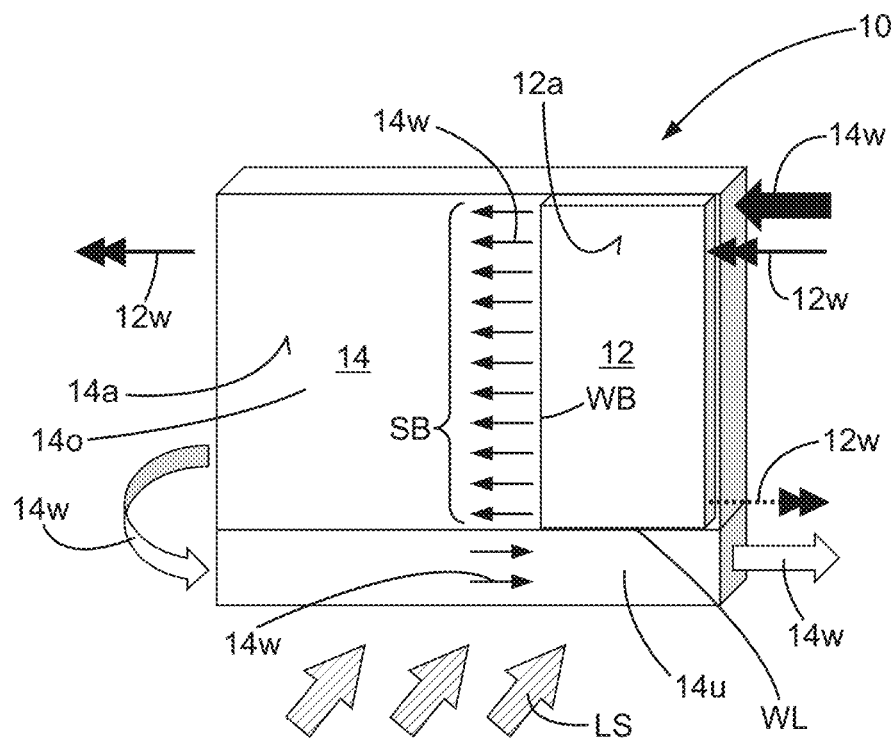
FIG. 1 is a simplified and schematic perspective view of an example of a radiator arrangement.

FIG. 1 shows a simplified and schematic perspective view of a radiator arrangement 10, which can be referred to as a radiator package. The radiator arrangement comprises a first heat exchanger 12 and a second heat exchanger 14. Relative to a main direction (hatched contour arrows) of an air flow LS through the radiator arrangement 10, the first heat exchanger 12 is arranged in front of the second heat exchanger 14. In other words, the first heat exchanger 12 and the second heat exchanger 14 are arranged serially or in series with respect to the air flow LS flowing through them.

Figure 5:
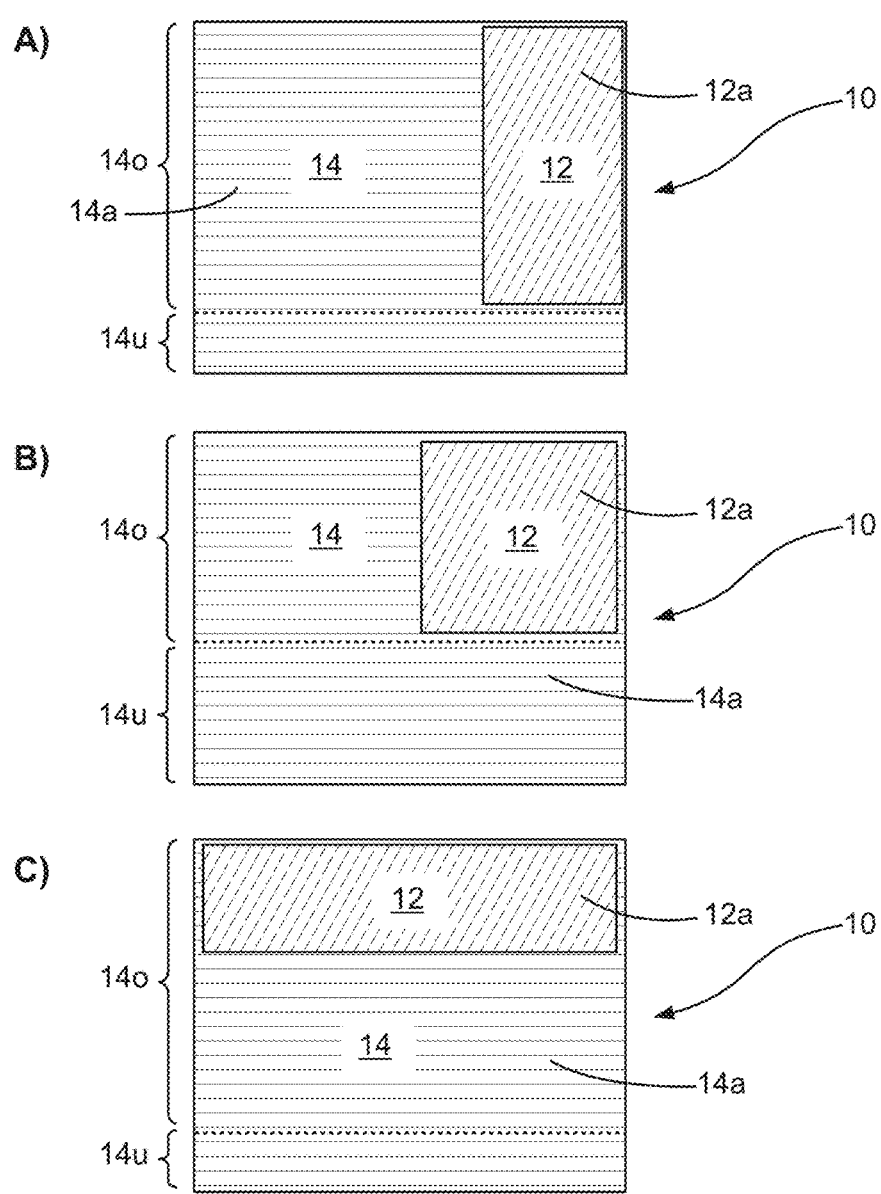
FIG. 5 is a simplified and schematic representation of overlapping base areas of heat exchangers of the radiator arrangements of FIGS. 1 to 4.

The first heat exchanger 12 has a first base area 12a which is exposed to the air flow LS and which is smaller than a second base area 14a of the second heat exchanger 14 which is exposed to the air flow LS. For the example of the radiator arrangement 10 in FIG. 1, reference is also made to the illustration in FIG. 5A, in which the first base area 12a (obliquely hatched) and the second base area 14a (horizontally hatched) can also be seen. The base area 12a, 14a can also be referred to as the effective area.

A fluid flow of a heat exchanger fluid through the first heat exchanger 12 is indicated by the black double arrows 12w. The heat exchanger fluid can only flow through the first heat exchanger 12 once with respect to the base or effective area 12a, which is illustrated by the two double arrows 12w with solid lines. This can also be referred to as an I-Flow. Alternatively, the heat exchanger fluid can flow through the first heat exchanger 12 twice with respect to the base area 12a, which is illustrated by the right double arrow 12w (solid line) and the double arrow 12w with dashed line. This can also be referred to as an U-Flow.

A fluid flow of a heat exchanger fluid through the second heat exchanger 14 is illustrated by black simple arrows 14w as well as the two contour arrows 14w with white (partially gray) filling.

In the radiator arrangement 10, the first base area 12a of the first heat exchanger 12 is dimensioned such that it overlaps the second base area 14a of the second heat exchanger 14 only in an inlet-side region with respect to the flow of heat exchanger fluid (arrows 14w) in the second heat exchanger 14.

The dimensioning of the first base area 12a depends on the required performance to be implemented by the first heat exchanger 12. With high performance requirements, this must be designed to be correspondingly more pronounced or larger than with low performance requirements. Accordingly, the effective region overlapped by the first heat exchanger 12 and the second heat exchanger 14 is larger or smaller. In other words: from a thermally highly loaded portion on the refrigerant inlet side of the second heat exchanger 14, the effective surface 12a of the first heat exchanger 12 extends increasingly into the effective surface 14 of the second heat exchanger. The proportions of overlap increase with increasing performance requirements of the first heat exchanger 12.

The first heat exchanger 12 can in particular be connected to a coolant circuit of a motor vehicle. The second heat exchanger 14 can in particular be connected to a refrigerant circuit of the motor vehicle. The heat transfer fluid in the first heat exchanger 12 can be, for example, a coolant such as water or a water-glycol mixture or the like. The heat exchanger fluid in the second heat exchanger 14 may, for example, be a refrigerant such as R1234yf or R744.

In the example of FIG. 1, the main flow direction 12w of coolant in the first heat exchanger 12 is substantially parallel to the main flow direction 14w of refrigerant in the second heat exchanger 14.

In the radiator arrangement 10, the second heat exchanger 14 is designed to distribute the inlet-side refrigerant flow 14w over a thermally effective flow width SB within the second heat exchanger 14. The first base area 12a of the first heat exchanger 12 has a width WB which essentially or ideally corresponds to the flow width SB in the second heat exchanger 14.

An effective length WL of the first heat exchanger 12 depends on the maximum performance to be fulfilled or reproduced.

From FIG. 1 it is further apparent that the second heat exchanger 14 has an upper heat exchanger region 14o and a lower heat exchanger region 14u, wherein the second base surface 14a comprises or encloses the upper heat exchanger region 14o and the lower heat exchanger region 14u, as is also apparent from FIG. 5A. The upper heat exchanger region 140 can be designed as a condensation path and the lower heat exchanger region 14u as a subcooling path. The first base area 12a of the first heat exchanger 12 overlaps only a (partial) region of the upper heat exchanger region 140.

Figure 2:
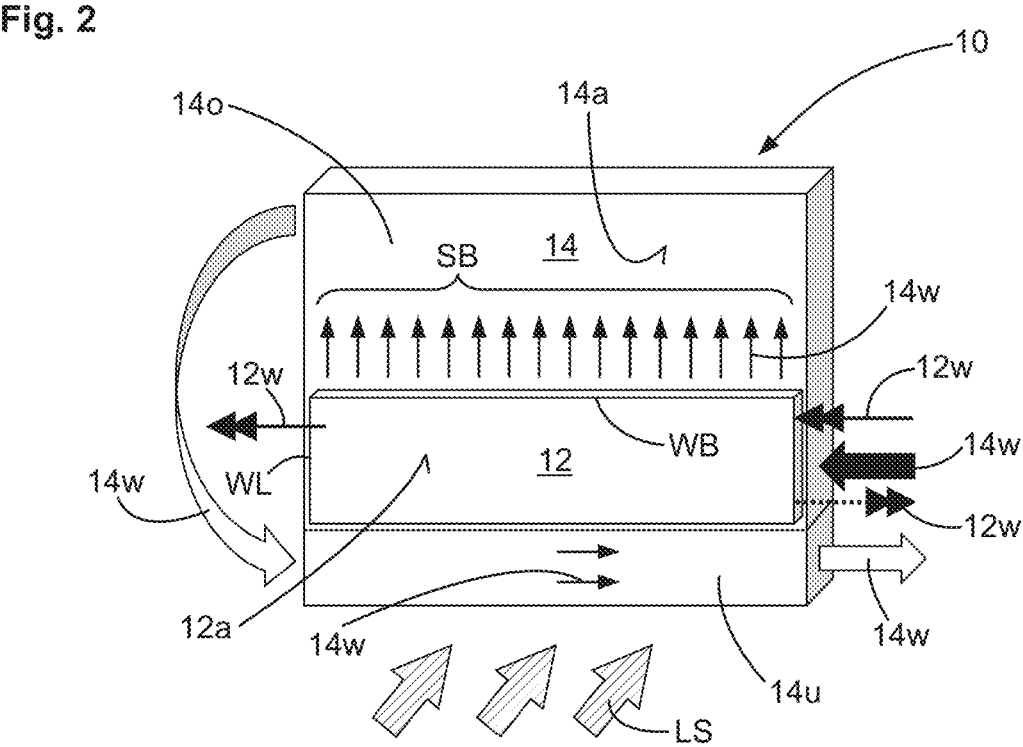
FIG. 2 is a simplified and schematic perspective view of a further example of a radiator arrangement.

FIG. 2 shows a further example of a radiator arrangement 10 with a first heat exchanger 12 and a second heat exchanger 14. In this example, the first heat exchanger 12 has a different positioning and dimensioning compared to FIG. 1 due to the different fluidic design (see arrows 14w) of the second heat exchanger 14. In this application example, the refrigerant flow direction and the coolant flow direction are aligned vertically or crosswise. Furthermore, the above description of FIG. 1 is also applicable and transferable to the example in FIG. 2. There is simply no further illustration in FIG. 5 for the example in FIG. 2.

Figure 3:
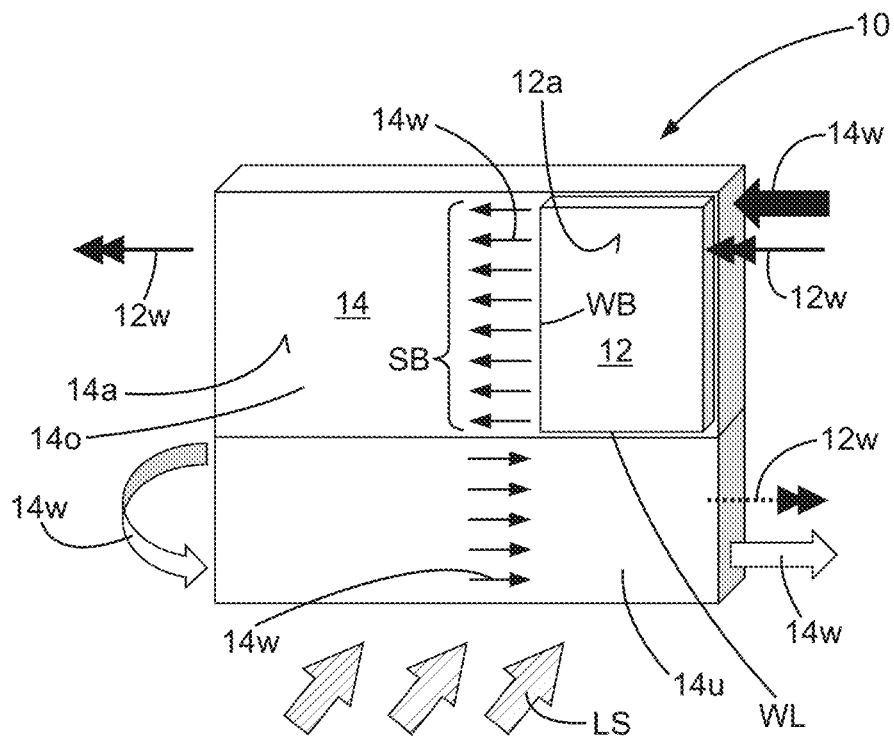
FIG. 3 is a simplified and schematic perspective view of a further example of a radiator arrangement.

FIG. 3 shows a further example of a radiator arrangement 10 with a first heat exchanger 12 and a second heat exchanger 14. In this example, the first heat exchanger 12 has a different positioning and dimensioning compared to FIGS. 1 and 2 due to the different fluidic design (see arrows 14w) of the second heat exchanger 14. Furthermore, however, the above description of FIG. 1 is also applicable and transferable to the example in FIG. 3. Regarding the arrangement and design of the first base surface 12a and the second base surface 14a, reference is also made to FIG. 5B.

Figure 4:
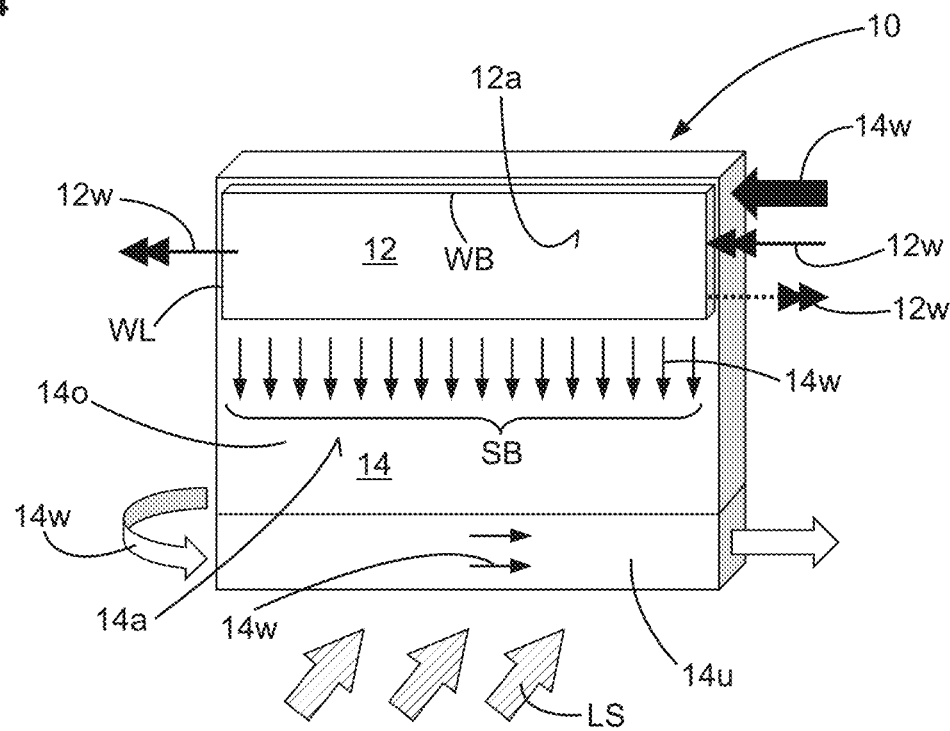
FIG. 4 is a simplified and schematic perspective view of a further example of a radiator arrangement.

FIG. 4 shows a further example of a radiator arrangement 10 with a first heat exchanger 12 and a second heat exchanger 14. In this example, the first heat exchanger 12 has a different positioning and dimensioning compared to FIGS. 1 to 3 due to the different fluidic design (see arrows 14w) of the second heat exchanger 14. Furthermore, FIG. 4 shows an example in which the second heat exchanger has a larger lower heat exchanger region 14u, which is not designed as a subcooling path in the true sense, particularly in the case of the use or application of supercritical refrigerants. Furthermore, however, the above description of FIG. 1 is also applicable and transferable to the example in FIG. 4. Regarding the arrangement and design of the first base surface 12a and the second base surface 14a, reference is also made to FIG. 5C.

All examples of radiator packages 10 of FIGS. 1 to 4 ensure that an air flow heated by the first heat exchanger 12 only occurs at points or regions of the second heat exchanger 14 that are so warm or hot that heat transfer to already heated air is possible. Thus, the efficiency of cooling the refrigerant in the second heat exchanger 14 can be increased, which leads to optimized operation of the refrigerant circuit or of the overall system connected to the second heat exchanger 14.

With reference to FIGS. 1 to 5, it is also pointed out that the first heat exchanger 12 is (significantly) smaller than the second heat exchanger 14. In particular, it can be seen from all examples in FIGS. 1 to 5 that the first base area 12a amounts to up to about 80% of the second base area 14a, in particular about 10% to 60%. For example, in FIG. 5A, the first base area 12a amounts to about 25% of the second base area 14a. In FIG. 5B, the first base area 12a is approximately 25% of the second base area 14. From FIG. 5C it can be seen that the first base area 12 is approximately 29% of the second base area 14.

Figure 6:
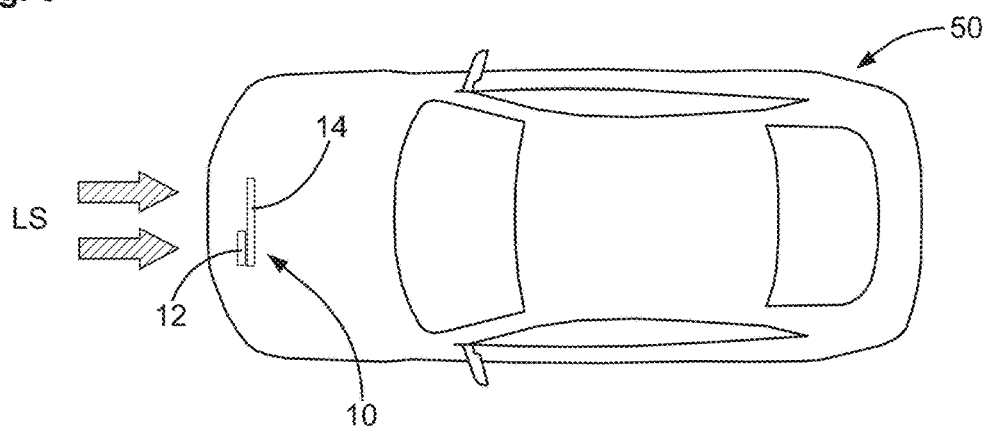
FIG. 6 is a simplified and schematic representation of a motor vehicle with a radiator arrangement.

FIG. 6 shows in a simplified and schematic plan view an at least partially electrically driven motor vehicle 50 with a radiator arrangement 10 described above with a first heat exchanger 12 and a second heat exchanger 14.

In summary, it should be noted that in a radiator arrangement 10, the flow and/or arrangement of the two heat exchangers 12, 14 is adapted such that a heated air flow of the first heat exchanger 14 impinges at locations or regions of the second heat exchanger 14 which, despite an increased air temperature level, enable heat transfer from the second heat exchanger 14 to the air flow. The arrangement of the two heat exchangers 12, 14 is in particular such that the outgoing air flow of the first heat exchanger 12 hits the warmest fluid-carrying segments of the downstream connected second heat exchanger 14. This is achieved in particular by the partially overlapping design of the first heat exchanger 12 and by taking into account the respective flow directions of heat exchanger fluid (coolant or refrigerant) in the two heat exchangers 12, 14.

The invention claimed is:

1. A radiator arrangement, in particular a radiator package, for a motor vehicle driven by an internal combustion engine or at least partially electrically, comprising:
   a first heat exchanger which is or can be connected to a coolant circuit of the motor vehicle;
   a second heat exchanger which is or can be connected to a refrigerant circuit of the motor vehicle;
   wherein, relative to a main direction of an air flow through the radiator arrangement, the first heat exchanger is arranged in front of the second heat exchanger,
   wherein a first base area of the first heat exchanger exposed to the air flow is smaller than a second base area of the second heat exchanger exposed to the air flow,
   wherein the first base area is dimensioned such that it overlaps the second base area only in an inlet-side region with respect to the refrigerant flow in the second heat exchanger.

2. The radiator arrangement according to claim 1, wherein the main flow direction of coolant in the first heat exchanger is substantially parallel or orthogonal to the main flow direction of refrigerant in the second heat exchanger.

3. The radiator arrangement according to claim 1, wherein the first base area amounts to approximately 80% of the second base area, in particular approximately 10% to 60%.

4. The radiator arrangement according to claim 1, wherein the second heat exchanger is designed to distribute the inlet-side refrigerant flow over a thermally effective flow width within the second heat exchanger, wherein the first base area has a width which substantially corresponds to the flow width in the second heat exchanger.

5. The radiator arrangement according to claim 1, wherein that the first heat exchanger is designed to pass coolant unidirectionally or bidirectionally with deflection.

6. The radiator arrangement according to claim 1, wherein that the second heat exchanger has at least one upper heat exchanger region and at least one lower heat exchanger region, wherein the second base area comprises the upper heat exchanger region and the lower heat exchanger region.

7. The radiator arrangement according to claim 6, wherein the lower heat exchanger region is designed as a subcooling path.

8. The radiator arrangement according to claim 6, wherein the first base area overlaps only a region of the upper heat exchanger region.

9. The radiator arrangement according to claim 8, wherein the main flow direction of coolant in the first heat exchanger is substantially parallel or orthogonal to the main flow direction of refrigerant in the upper heat exchanger region of the second heat exchanger.

10. The radiator arrangement according to claim 1, wherein the first heat exchanger is a low-temperature radiator.

11. The radiator arrangement according to claim 1, wherein the second heat exchanger is a condenser or gas radiator.

12. A motor vehicle with internal combustion engine or with an at least partially electric drive with
- at least one coolant circuit for cooling at least one electrical component, in particular a high-voltage battery and/or electric motor;
- at least one refrigerant circuit for air conditioning a vehicle interior; and
- a radiator arrangement according to claim 1, wherein the first heat exchanger is connected to the refrigerant circuit and the second heat exchanger is connected to the coolant circuit.

13. The radiator arrangement according to claim 2, wherein the first base area amounts to approximately 80% of the second base area, in particular approximately 10% to 60%.

14. The radiator arrangement according to claim 2, wherein the second heat exchanger is designed to distribute the inlet-side refrigerant flow over a thermally effective flow width within the second heat exchanger, wherein the first base area has a width which substantially corresponds to the flow width in the second heat exchanger.

15. The radiator arrangement according to claim 3, wherein the second heat exchanger is designed to distribute the inlet-side refrigerant flow over a thermally effective flow width within the second heat exchanger, wherein the first base area has a width which substantially corresponds to the flow width in the second heat exchanger.

16. The radiator arrangement according to claim 2, wherein that the first heat exchanger is designed to pass coolant unidirectionally or bidirectionally with deflection.

17. The radiator arrangement according to claim 3, wherein that the first heat exchanger is designed to pass coolant unidirectionally or bidirectionally with deflection.

18. The radiator arrangement according to claim 4, wherein that the first heat exchanger is designed to pass coolant unidirectionally or bidirectionally with deflection.

19. The radiator arrangement according to claim 2, wherein that the second heat exchanger has at least one upper heat exchanger region and at least one lower heat exchanger region, wherein the second base area comprises the upper heat exchanger region and the lower heat exchanger region.

20. The radiator arrangement according to claim 3, wherein that the second heat exchanger has at least one upper heat exchanger region and at least one lower heat exchanger region, wherein the second base area comprises the upper heat exchanger region and the lower heat exchanger region.

* * * * *